United States Patent Office 2,747,940
Patented May 29, 1956

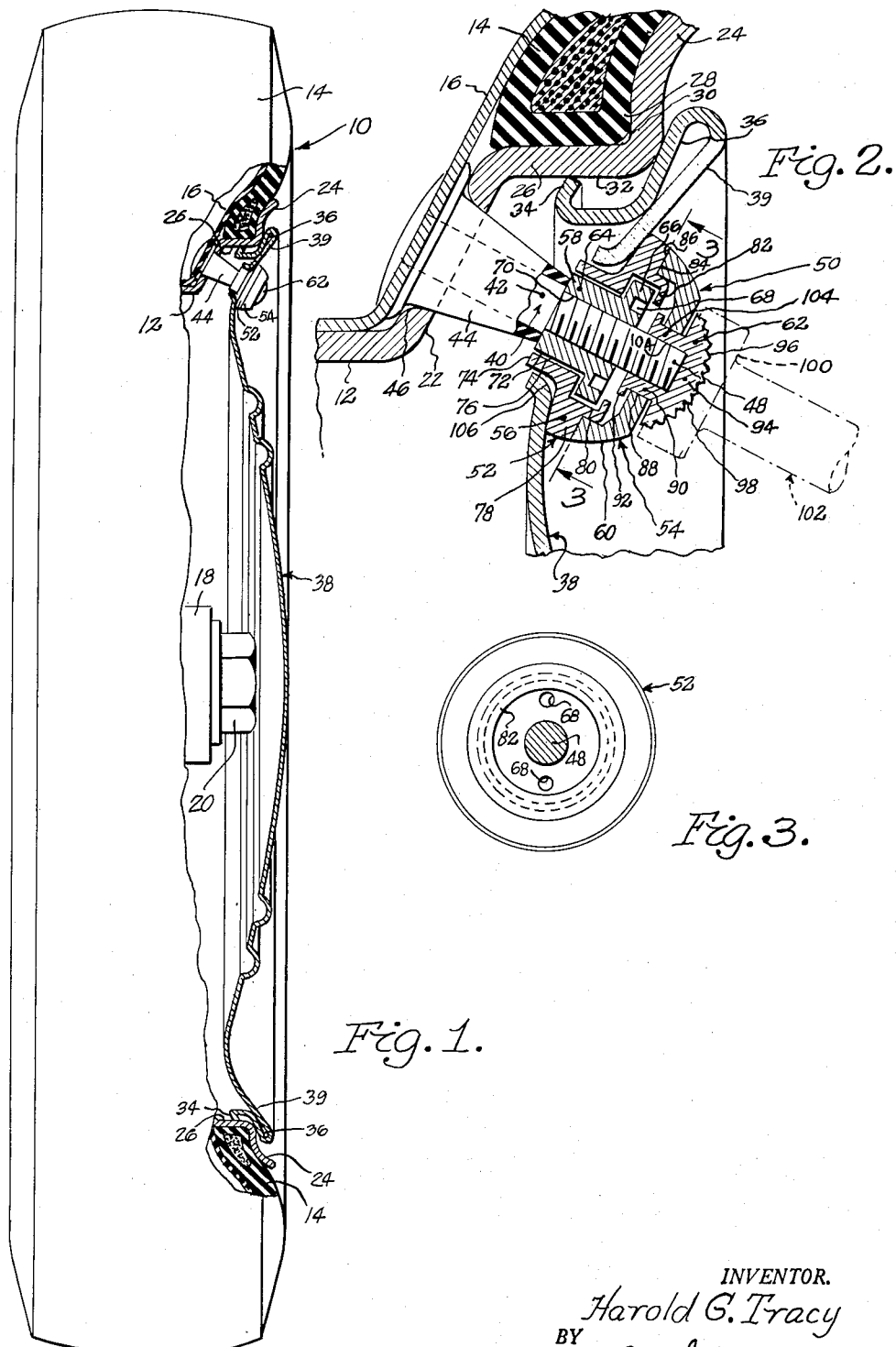

2,747,940

ANTI-THEFT LOCK FOR VEHICLE HUB CAPS

Harold G. Tracy, Detroit, Mich.

Application October 7, 1953, Serial No. 384,654

4 Claims. (Cl. 301—37)

This invention relates to hub caps for motor vehicle wheels and, in particular, to locks for preventing theft of such hub caps.

Motor vehicle wheels formerly used a small hub cap or disc in the center thereof to conceal the wheel hub and nut. In recent years, these hub caps have been increased in size so that they cover almost the entire wheel. With their increase in size they have become much more expensive and consequently the subject of increasing thefts. Hitherto, it has been necessary only for the thief to pry the hub cap out of its seat in the wheel by means of an ordinary screw driver since there has been no lock upon the market for preventing the unauthorized removal of such hub caps.

One object of the present invention, therefore, is to provide a simple but effective locking device which will frustrate ordinary efforts of stealing such hub caps.

Another object is to provide a hub cap lock which is attached to the threaded valve stem of the inner tube of the tire by means of a special tool or key, this tool or key being necessary for the removal of the device before the hub cap itself can be removed.

Another object is to provide a hub cap lock of the foregoing character which will still permit the periodic inflation of the vehicle tires, yet will prevent theft of the hub caps themselves.

Another object is to provide a hub cap lock which will fit the valve stems and hub caps of the wheels of any make of modern automobile employing such hub caps.

Other objects and advantages of the invention will become apparent during the course of the following description of the accompanying drawings, wherein:

Figure 1 is a front elevation of a vehicle wheel and tire, with the hub cap and adjacent structure in central vertical section, showing a hub cap lock of the present invention applied thereto;

Figure 2 is an enlarged fragmentary vertical section constituting the upper left-hand corner portion of Figure 1, with the lock also shown in central vertical section; and Figure 3 is a cross-section through the lock taken substantially along the line 3—3 in Figure 2.

Referring to the drawings in detail, Figures 1 and 2 show a vehicle wheel, generally designated 10, having a conventional rim 12 on which is mounted the usual tire or casing 14 with an inner tube 16 therein, the rim 12 having the usual central disc portion of dished form (not shown) bolted to the wheel hub 18. The hub 18 is as usual mounted on the axle (not shown) and held in position by the usual nut 20. The rim 12 has the usual inner and outer flanges 22 and 24 interconnected by the intermediate flange 26, the bead 28 of the tire 14 resting in the annular recess 30 between the outer and intermediate flanges 24 and 26 (Figure 2). The intermediate flange 26 is approximately cylindrical and coaxial with the wheel hub 18 and has a cylindrical inner surface 32 which is frictionally engaged by the teeth of prongs 34 on the inner flange 36 of the hub cap 38. The inner flange 36 is bent reversely inward relatively to the peripheral portion 39 of the hub cap 38 so as to provide a spring effect, thereby urging the teeth 34 against the surface 32 of the intermediate flange 26 and causing them to firmly grip the flange 26.

The inner tube 16 is provided with the usual valve, generally designated 40, for admitting and releasing compressed air, the valve 40 having a stem 42, the inner portion of which is surrounded by a tapered sleeve 44 of natural or synthetic rubber or other suitable material, the inner flange 22 of the rim 12 having a hole 46 through which the valve stem 42 and its sleeve 44 pass (Figure 2). The outer portion 48 of the valve stem 42 is externally threaded with a standard thread which is the same for the majority of inner tubes made by different manufacturers, this threaded valve stem portion 48 customarily receiving the valve cap which is threaded thereon. The interior of the valve stem 42 is provided with the usual valve seat and threaded internally in the usual manner to receive a standard valve core (not shown) which is likewise the same for the majority of manufacturers of inner tubes.

Threaded externally upon the threaded outer portion 48 of the valve stem 42 is the hub cap lock, generally designated 50, of the present invention, one form of which is shown in the drawings. The hub cap lock 50 is subdivided into the lock unit, generally designated 52, and the cover unit, generally designated 54. The lock unit 52 in turn consists of two relatively movable outer and inner parts 56 and 58, whereas the cover unit 54 likewise consists of two relatively movable outer and inner parts 60 and 62 respectively. The inner part 58 of the lock unit 52 consists of an internally-threaded tubular portion or sleeve with a flange 66 at its outer end containing spanner or key holes 68 or recesses adapted to be engaged by a special spanner or key (not shown) equipped with correspondingly-located pins fitting the holes or recesses 68. The holes or recesses 68 and the spanner or key pins for them are preferably made in a wide variety of arrangements to foil thieves from making or acquiring keys to fit any considerable number of locks.

The bore 70 of the inner part 58 is tapped with a thread corresponding to the threaded portion 48 of the valve stem 42, whereas the outer annular surface 72 thereof is smooth. The outer part 56 likewise has a tubular or sleeve portion 74 with a smooth bore 76 therein loosely and rotatably mounted upon the tubular portion 64 of the inner part 58 and having at its forward end an enlargement 78. The latter has an internal groove 80 loosely and rotatably engaging the flange 66 of the inner part 58, so that even if the outer part 56 is grasped by pliers and rotated, it will not rotate or unscrew the inner part 58. The outer wall 82 of the groove 80 is originally cylindrical and axial, and is bent into the radial position shown in Figure 2 after the inner part 58 has been inserted, as shown in Figure 3. The outer part 56 of the lock unit 52 is provided with an annular rabbet or seat 84 for engagement by the correspondingly-shaped annular periphery 86 of the outer part 60 of the cover unit 54. The latter is provided with a central hole 88 in which the tubular stem 90 of the inner part 62 is loosely and rotatably inserted. After insertion, a flange 92 is subsequently formed on the end of the tubular stem 90 to retain the inner part 62 in the hole 88. The inner part 62 on its outer end is provided with a dome-shaped head 94 which is preferably knurled or roughened as at 96 to receive the correspondingly-shaped recess 98 in the end 100 of a special tool 102 employed for removing it. The recess 98 is also preferably roughened to increase its frictional grip. The inner part 62 is provided with an internally-threaded socket 104 having a thread corresponding to and fitting upon the threaded outer portion 48 of the valve stem 42 so as to establish an air-tight connection therebetween.

In the operation of the invention, after the hub cap 38 has been placed in position, the lock unit 56 is first installed upon the valve stem 42 by threading its inner part 58 upon the threaded portion 48 thereof by means of a spanner or special key engaging the holes or recesses 68. The annular enlargement 78 of the outer part 56 comes to rest in abutting engagement with the portion of the hub cap 38 surrounding the hole 106 therein provided for the valve 40, firmly locking the hub cap 38 in position against unauthorized removal. The user then caps the valve stem 42 to prevent escape of air which may have leaked past the valve by screwing the cover or valve cap unit 54 onto the outer end of the threaded portion 48 of the valve stem 42. This may be started by means of the fingers, in order to properly thread the internally-threaded socket 104 of the inner part 62 on the threaded valve stem portion 48, after which the special tool 102 is applied to the knurled portion 94 in the manner shown in Figure 2, and rotated to tighten the inner part 62 firmly on the end of the valve stem 42. By this action, the outer part 60 of the cover or cap unit 52 is forced firmly against the outer part 56 of the lock unit 52, so as to cover the latter and exclude dirt.

If a thief attempts to steal the hub cap 38, he is able to remove only that portion of it diametrically opposite the valve 40. The lock 50 by its engagement with the hub cap 38 around the hole 106 therein prevents further withdrawal of the hub cap and thwarts any attempts at stealing the hub cap which a thief is likely to have the time or incentive to exert, as he will undoubtedly transfer his efforts to cars not equipped with the lock of the present invention.

To remove the cap or cover unit 54 in order to inflate the tire, the user merely applies the special tool 102 and rotates it, the engagement of its recess 98 with the roughened or knurled portion 96 on the dome 94 causing the torque applied to the tool 102 to be transmitted to the inner part 62 so as to loosen its grip upon the threaded valve stem portion 48. When this has been done, the fingers may be applied to the inner part 62 to remove the valve cap or cover 54. The tire is then inflated in the usual way.

Even if a thief is able to remove the valve cap or cover unit 54, he is unable to remove the lock unit 52 unless he possesses a spanner or key with the pins thereof located correspondingly to the holes or recesses 68. If he applies pliers to the outer part 56, it merely rotates loosely without rotating the inner part 58, and does not affect the position of the lock unit 52 upon the valve stem 50.

In the event of a puncture or other occurrence making it necessary or advisable to remove the inner tube 16, the owner or other authorized person possessing the proper key or spanner applies its pins to the holes 68 and rotates the inner part 58 to unscrew it from the threaded valve stem portion 48. When the lock unit 52 has been removed in this manner, the operator is free to pry the hub cap 38 loose from its engagement with the rim flange 26 by means of a screw driver or other tool, and withdraw it over the valve stem 40, the latter passing through the hole 106 in the hub cap 38 without interference.

What I claim is:
1. An anti-theft hub cap lock adapted to be installed upon the threaded tire valve stem which projects through a hole in the hub cap of a vehicle wheel, said lock comprising an inner lock member having a threaded portion adapted to threadedly engage said threaded portion of said valve stem, an outer lock member of larger size than said hub cap hole loosely and rotatably connected to said inner lock member, and a cover unit having a threaded central portion threadedly engaging the outer end of said valve stem and a marginal portion overlying and covering said inner lock member.

2. An anti-theft hub cap lock adapted to be installed upon the threaded tire valve stem which projects through a hole in the hub cap of a vehicle wheel, said lock comprising an inner lock member having a threaded portion adapted to threadedly engage said threaded portion of said valve stem, an outer lock member of larger size then said hub cap hole loosely and rotatably connected to said inner lock member, and a cover unit having a threaded central portion threadedly engaging the outer end of said valve stem and a marginal portion overlying and covering said inner and outer lock members.

3. An anti-theft hub cap lock adapted to be installed upon the threaded tire valve stem which projects through a hole in the hub cap of a vehicle wheel, said lock comprising an inner lock member having a threaded portion adapted to threadedly engage said threaded portion of said valve stem, an outer lock member of larger size than said hub cap hole loosely and rotatably connected to said inner lock member, said inner lock member having a key-receiving portion thereon for application of a rotatable removal key, and a cover unit having a threaded central portion threadedly engaging the outer end of said valve stem and a marginal portion overlying and covering said inner lock member including said key-receiving portion.

4. An anti-theft hub cap lock adapted to be installed upon the threaded tire valve stem which projects through a hole in the hub cap of a vehicle, said lock comprising an inner lock member having a threaded portion adapted to threadedly engage said threaded portion of said valve stem, an outer lock member of larger size than said hub cap hole loosely and rotatably connected to said inner lock member, and a cover unit having a threaded central portion threadedly engaging the outer end of said valve stem and a marginal portion overlying and covering said inner lock member, said cover unit central portion having a domed external surface thereon.

References Cited in the file of this patent
UNITED STATES PATENTS

| | | |
|---|---|---|
| 1,486,448 | Norlund | Mar. 11, 1924 |
| 1,685,924 | Lee | Oct. 2, 1928 |
| 2,048,442 | Frank | July 21, 1936 |
| 2,076,789 | Le Jeune | Apr. 13, 1937 |
| 2,179,045 | Lewis | Nov. 7, 1939 |
| 2,316,695 | Jaffa | Apr. 13, 1943 |
| 2,670,245 | Kimerer | Feb. 23, 1954 |

FOREIGN PATENTS

| | | |
|---|---|---|
| 653,816 | France | Mar. 28, 1929 |